Patented Dec. 19, 1944

2,365,631

UNITED STATES PATENT OFFICE 2,365,631

OXIDATION OF HALOGENATED HYDROCARBONS

William L. Faith, Manhattan, Kans., assignor to Sharples Chemicals Inc., Philadelphia, Pa., a corporation of Delaware No Drawing. Application December 18, 1941, Serial No. 423,519

6 Claims. (Cl. 260—537)

The present invention relates to the manufacture of aliphatic polycarboxylic acids and their anhydrides, and is concerned particularly with the production of unsaturated compounds such as maleic and fumaric acids and the corresponding anhydrides. The invention provides a process by which these products may be economically obtained from plentiful and relatively inexpensive raw materials.

The applicant has discovered that these products are obtained when an aliphatic halide containing at least four carbon atoms in a straight chain is subjected to oxidation by an oxygen-containing gas, under conditions involving maintenance of temperature, pressure, contact time and catalyst, controlled to prevent complete destructive oxidation of the alkyl halide material under treatment, while effecting the desired limited oxidation to form the unsaturated polycarboxylic acid products. The aliphatic halide to be oxidized may be a saturated or unsaturated compound, or a mixture including a variety of compounds of different molecular weights and degrees of halogenation, and it may also contain substituents other than halogen.

It is necessary that the material to be oxidized include a straight chain of at least four carbon atoms, and that at least two non-terminal carbon atoms of this chain have hydrogen atoms attached thereto, although the compound may be branched at other parts of its structure. Thus, the various mono-halogenated derivatives of n-butane may be oxidized in the practice of the process to obtain maleic and fumaric acids and anhydrides, as may also the various poly-halogenated derivatives of this compound except those which contain two halogen atoms attached to one of the two intermediate carbon atoms. Similarly, the various chloro- and other halogenated derivatives of straight and branched chain alkanes higher than butane may be oxidized to produce these acid products so long as the molecule has some part containing at least four carbon atoms in a straight chain and hydrogen attached to at least two adjacent intermediate carbon atoms of the chain, or is capable of rearranging to form such a compound under the conditions of the reaction. Either maleic or fumaric acid may be obtained, depending on the method of recovery used, as will be understood by those skilled in the art.

Various halogenated compounds, including chlorinated hydrocarbons, such as mono- and poly-chlorides of the pentanes, hexanes, heptanes, etc., including even such compounds as may contain four or more chlorine atoms, may be treated in the practice of the invention, and even relatively high boiling materials, such as chlorinated kerosene and chlorinated paraffin wax may be oxidized to form the desired acid substances, provided they may be vaporized as such or after mild pyrolysis. Halogen substituted alkenes may also be oxidized provided they fulfill the above requirements of having four carbon atoms in a straight chain and two hydrogen atoms attached to such chain as discussed above.

The halogen substituted alkanes or alkenes may also contain other substituents, such as hydroxy groups, aldehyde groups, acid groups, etc., so long as they fulfill the other requirements specified above.

The invention is preferably practiced by passing the oxygen-containing gas, in admixture with the halide to be oxidized, continuously through a heated chamber containing an oxidation catalyst, in cases in which the halide may be readily volatilized. The preferred catalysts are the various oxides and salts of the metals of the fifth and sixth groups of the periodic series, the oxides of vanadium, molybdenum, tungsten, chromium and uranium being the most effective. The compounds of the fifth and sixth groups of the periodic series used as catalysts in the practice of the invention may either be used in substantially pure form, or in admixture with each other or with other oxidation catalysts or promoters. Mixtures of vanaduim oxide wtih small amounts of other, and difficultly reducible, metal oxides, such as the oxides of titanium, cerium, iron, nickel or cobalt, may also be used in the practice of the invention.

The catalysts of the invention may either be used as such, or they may be supported by any suitable catalyst carrier, such as aluminum, alundum, pumice, asbestos, alfrax, alumina, kieselguhr, silica gel or carborundum. Various mixtures of materials may be used as catalysts, providing these mixtures contain, as an essential constituent, an oxide or salt of one of the metals of the fifth and sixth groups of the periodic series.

Among the various compounds which may be oxidized, the various chloro-substitution products of paraffin and olefin hydrocarbons containing from 4 to 15 carbon atoms are preferred as starting materials, the mono-, di- and tri-chloro derivatives and mixtures thereof being particularly satisfactory. Chlorine derivatives of hydrocarbons containing between four and eight carbon atoms are especially suitable, and, for the sake of illustration, we will describe the practice of the invention as applied to amyl mono- and polychlorides derived from commercial chlorination of pentane in the vapor phase.

In the practice of the invention, the chloropentane material to be oxidized may be vaporized and passed through a heated reaction chamber containing the catalyst in finely divided form, after being mixed with a stream of oxygen-containing gas, which may be air or any other mixture containing oxygen, or may be pure oxygen, as desired.

The quantity of oxygen in the mixture passed over the catalyst constitutes a very substantial molecular excess over the quantity of amyl chloride treated. Experiments have indicated that it is desirable that the quantity of oxygen should preferably be in excess of that theoretically required to effect complete combustion of the chloro-hydrocarbons to produce carbon dioxide and water, regardless of the particular chloro-hydrocarbon treated. Best results have been attained by use of molecular ratios of oxygen to chlorohydrocarbon in excess of 25:1, and preferred operation in the oxidation of chloropentanes involves use of ratios of oxygen to chloropentanes of between 70:1 and 125:1. Ratios which are even above 1000:1 have been successfully used. It is desirable that relatively high ratios such as the range above 70:1 be used both in order to facilitate the reaction and to preclude the danger of explosion, although ratios within the explosive limit may be used, provided reaction conditions are carefully controlled to preclude the possibility of explosion.

The temperature maintained in the catalyst-containing chamber in which the oxidation reaction occurs should be sufficiently high to cause reasonably rapid conversion of the chloro-pentane to the desired acid product, but should not be so high as to cause destructive oxidation of all of the chloro-hydrocarbon, or the major part thereof, to produce carbon dioxide.

The factor of temperature control is closely related to the factor of time of contact of the reacting gases with the catalyst, and it is impossible to give accurate generalizations as to optimum conditions because of this inter-relationship. As a general rule, the catalyst should be maintained at temperatures of between about 300° C. and about 550° C., although the process may be practiced at temperatures even as high as 700° C. The optimum temperature is at about 450° C. under the best conditions for practice of the invention in accordance with experiments conducted up to the present time. At temperatures below 350° C. the reaction is relatively slow with most catalysts, and this fact results in reduced conversions, unless the time of contact between the reacting gases and the catalyst is materially increased by reducing the space velocity. Persons skilled in the art will realize that the temperature may vary in different parts of the catalyst bed and the temperatures discussed above are those preferred for the central portion of the mass of catalyst through which the gases are passed. With most reaction temperatures, catalyst material which is near the entrance and exit ends of the convertor and near the walls may be at a lower temperature than those indicated above, while the maximum temperature may be somewhat higher.

Those skilled in the art will also realize that approximately the same conversions may be obtained in passage of material through the catalyst-containing chamber when a low space velocity is used at a low catalyst temperature as those obtained when a high space velocity is used with a high catalyst temperature. Space velocities ranging from about 2.5 to about 150 liters of gaseous chlorinated hydrocarbon (calculated at 0° C. and 760 mm. pressure) per liter of catalyst per hour have been successfully used in practice of the invention, when proper adjustment of the temperature is made in accordance with the general rules discussed above.

The process may be operated under various pressures ranging from sub-atmospheric pressure to a pressure of many atmospheres. Pressures between 0.5 and 3 atmospheres absolute have been used to advantage in the practice of the invention.

The above discussion of optimum temperatures, pressures and space velocities is applicable to oxidation in the vapor phase of various halogen derivatives of alkanes and alkenes (these expressions being used to include derivatives of paraffins and olefins which may be substituted by other radicals in addition to halogen, as discussed above). In general, higher temperatures and/or lower space velocities will be found to produce best results with materials of lower carbon content, and lower temperatures and/or higher space velocities will be best for compounds of higher carbon content.

The optimum temperatures for treatment of any given halogenated alkane or alkene may be determined experimentally, and will usually be found to be within the limits discussed above. In such experimentation, if destructive oxidation of the material to be oxidized occurs to an objectionable extent, such destructive oxidation may be reduced by reducing the temperature or increasing the space velocity. If, on the other hand, the proportionate conversion to the desired derivatives is smaller than desired in passage of a given quantity of the derivative through the catalyst-containing chamber, the conversion may ordinarily be improved by increasing the temperature or reducing the space velocity.

*Example I*

A mixture of 273 grams of a dichloropentane fraction and 164 cubic feet of air (measured at 70° F.) was passed over 100 cc. of a catalyst for a period of four hours. The catalyst was prepared as given below. The temperature of the catalyst mass was maintained at 550° C. The exhaust gases were cooled and yields of 0.263 mole of fumaric acid and 1.75 moles of HCl per mole of dichloropentane were recovered.

Preparation of catalyst:

140 cc. of clean aluminum pellets made by compressing aluminum turnings were just covered with distilled water. 10 grams of ammonium metavanadate and 10 grams of oxalic acid were added to the mixture and the resulting mixture was evaporated to dryness with constant stirring. Air was passed over the resulting pellets at a temperature between 350° C. and 450° C. for a period of four hours and 40 minutes.

*Example II*

A mixture of 227 grams of a dichloropentane fraction and 328 cubic feet of air (measured at 70° F.) was passed over 100 cc. of catalyst prepared as given below for a period of eight hours. The temperature of the catalyst mass was maintained at 450° C. The gases leaving the catalyst chamber were cooled and yields of 0.344 moles of fumaric acid and 1.88 moles of HCl per mole of dichloropentane were recovered.

Preparation of catalyst: 200 cc. of alfrax pellets were just covered with distilled water, and 20 grams of ammonium metavanadate and 20 grams of oxalic acid were added. The resulting mixture was evaporated to dryness with constant stirring. Air was passed over the resulting pellets at a temperature varying between 390° C. and 450° C. for a period of seven hours.

Example III

A mixture of 5.66 grams of a polychloropentane fraction (containing more than two atoms of chlorine per molecule) and 563 liters of air (measured at 70° F.) was passed over 60 cc. of a catalyst prepared as given below for a period of two hours. The temperature of the catalyst was maintained at 450° C. The gases leaving the catalyst chamber were cooled and yields of 0.339 mole of maleic acid and 2.36 moles of HCl per mole of polychloropentane were recovered.

Preparation of catalyst: 200 cc. clean aluminum pellets made by compressing aluminum turnings were just covered with distilled water. 15 grams ammonium metavanadate and 15 grams oxalic acid were added to the mixture and the resulting mixture was heated to dryness with constant stirring. Air was passed over the resulting pellets at 450° C. for a period of six hours.

Example IV

A mixture of 507 grams of a dichloropentane fraction and 328 cubic feet of air (measured at 70° F.) was passed over 100 cc. of catalyst prepared as shown below for a period of eight hours. The temperature of the catalyst was maintained at 370° C. The gases leaving the catalyst chamber were cooled and yields of 0.124 mole of fumaric acid and 1.08 moles of HCl per mole dichloropentane were recovered.

Preparation of catalyst: 200 cc. of carborundum pellets were just covered with distilled water and 20 grams each of ammonium metavanadate and oxalic acid were added to the mixture. The resulting mixture was evaporated to dryness with constant stirring. Air was passed over the resulting pellets at 450° C. for a period of seven hours.

Example V

A mixture of 3.93 grams of a dichloropentane fraction and 511 liters of air (measured at 70° F.) was passed over 60 cc. of catalyst prepared as given below for a period of two hours. The temperature of the catalyst was maintained at 550° C. The gases leaving the catalyst chamber were cooled and yields of 0.077 mole of maleic acid and 1.25 moles of HCl were recovered per mole of dichloropentane.

Preparation of catalyst: 80 cc. clean aluminum pellets made by compressing aluminum turnings were just covered with distilled water. 23.2 grams WO$_3$, 14 cc. of concentrated ammonium hydroxide and 10 grams oxalic acid were added successively and the resulting mixture was evaporated to dryness with constant stirring. Air was passed over the catalyst at a temperature not exceeding 400° C. for a period of four hours.

Example VI

A mixture of 4.73 grams of a dichloropentane fraction and 511 liters of air (measured at 70° F.) was passed over 60 cc. of catalyst prepared as given below for a period of two hours. The temperature of the catalyst was maintained at 400° C. The gases leaving the catalyst chamber were cooled and yields of 0.305 moles of maleic acid and 1.53 moles of HCl were recovered per mole of dichloropentane.

Preparation of catalyst: 80 cc. of clean aluminum pellets made by compressing aluminum turnings were just covered with distilled water. Five grams of ammonium metavanadate, 5 grams of oxalic acid, and 0.2 gram of titanium dioxide were added in the order named, and the resulting mixture was evaporated to dryness with constant stirring. Air was passed over the catalyst at a temperature between 350° C. and 400° C. for a period of six hours.

Example VII

A mixture of 10.8 grams of normal butyl chloride and 502 liters of air (measured at 70° F.) was passed over 60 cc. catalyst prepared as in Example III, for a period of two hours. The temperature of the catalyst was maintained at 550° C. The gases leaving the catalyst chamber were cooled and yields of 0.116 moles of maleic acid and 0.83 mole of HCl per mole of normal butyl chloride were recovered.

Example VIII

A mixture of 382 grams of a chlorinated kerosene fraction and 412 cubic feet of air (measured at 70° F.) was passed over 100 cc. catalyst prepared as in Example II, for a period of eight hours. The temperature of the catalyst was maintained at 425° C. The gases leaving the catalyst chamber were cooled and yields of 0.085 gram of maleic acid and 0.101 grams of HCl were recovered per gram of the chlorinated kerosene fraction treated.

Various modifications are possible within the scope of the invention, and I do not therefore wish to be limited except by the scope of the following claims.

I claim:

1. In the manufacture of acids of the class consisting of maleic and fumaric acids, the process comprising selectively oxidizing a chloro substitution product of a paraffin hydrocarbon containing between 4 and 8 carbon atoms which contains at least 4 carbon atoms in a straight chain portion of the molecule and has hydrogen atoms attached to at least two adjacent intermediate carbon atoms of said straight chain portion, said oxidation being effected by vapor phase passage of said hydrocarbon substitution product with gas containing free oxygen over a catalyst chosen from the class consisting of salts and oxides of vanadium, molybdenum, tungsten, chromium and uranium, while the mixture is heated to a temperature between 300° C. and 700° C.

2. In the manufacture of acids of the class consisting of maleic and fumaric acids, the process comprising selectively oxidizing a chloro substitution product of a pentane containing at least 4 carbon atoms in a straight chain portion of the molecule and hydrogen atoms attached to at least two adjacent intermediate carbon atoms of said straight chain portion, said oxidation being effected by vapor phase passage of said pentane substitution product with gas containing free oxygen over a catalyst chosen from the class consisting of salts and oxides of vanadium, molybdenum, tungsten, chromium and uranium, while the mixture is heated to a temperature between 300° C. and 700° C.

3. In the manufacture of acids of the class consisting of maleic and fumaric acids, the process comprising selectively oxidizing a chloro substitution product of a pentane containing at least 4 carbon atoms in a straight chain portion of the molecule and hydrogen atoms attached to at least two adjacent intermediate carbon atoms of said straight chain portion, said oxidation being effected by vapor phase passage of said pentane substitution product with gas containing free oxygen over an oxide of vanadium while the mixture is heated to a temperature between 300° C. and 700° C.

4. In the manufacture of acids of the class consisting of maleic and fumaric acids, the process comprising selectively oxidizing a chloro substitution product of an aliphatic hydrocarbon containing between 4 and 15 carbon atoms which contains at least 4 carbon atoms in a straight chain portion of the molecule and has hydrogen atoms attached to at least two adjacent intermediate carbon atoms of said straight chain portion, said oxidation being effected by vapor phase passage of said hydrocarbon substitution product with gas containing free oxygen over a catalyst chosen from the class consisting of salts and oxides of vanadium, molybdenum, tungsten, chromium and uranium, while the mixture is heated to a temperature between 300° C. and 700° C.

5. In the manufacture of acids of the class consisting of maleic and fumaric acids, the process comprising selectively oxidizing a halogen substitution product of an aliphatic hydrocarbon containing between 4 and 15 carbon atoms which contains at least 4 carbon atoms in a straight chain portion of the molecule and has hydrogen atoms attached to at least two adjacent intermediate carbon atoms of said straight chain portion, said oxidation being effected by vapor phase passage of said hydrocarbon substitution product with gas containing free oxygen over a catalyst chosen from the class consisting of salts and oxides of vanadium, molybdenum, tungsten, chromium and uranium, while the mixture is heated to a temperature between 300° C. and 700° C.

6. In the manufacture of acids of the class consisting of maleic and fumaric acids, the process comprising selectively oxidizing a chloro substitution product of an aliphatic hydrocarbon containing between 4 and 15 carbon atoms which contains at least 4 carbon atoms in a straight chain portion of the molecule and has hydrogen atoms attached to at least two adjacent intermediate carbon atoms of said straight chain portion, said oxidation being effected by vapor phase passage of said hydrocarbon substitution product with gas containing free oxygen over an oxide of vanadium while the mixture is heated to a temperature between 300° C. and 700° C.

WILLIAM L. FAITH.